United States Patent
Jacobsen (12)

(10) Patent No.: US 6,338,886 B1
(45) Date of Patent: Jan. 15, 2002

(54) MULTI-LAYER PAD OF PROTECTIVE MATERIAL

(76) Inventor: Lee S. Jacobsen, 865 S. Highland, Deaborn, MI (US) 48124

( * ) Notice: Subject to any disclaimer, the term of this patent is extended or adjusted under 35 U.S.C. 154(b) by 0 days.

(21) Appl. No.: 09/364,345

(22) Filed: Jul. 30, 1999

(51) Int. Cl.$^7$ .............................. B32B 7/12; B32B 3/26
(52) U.S. Cl. .................... 428/40.1; 428/41.6; 428/41.7; 428/332; 428/343; 428/354; 428/500
(58) Field of Search ................................ 428/343, 332, 428/354, 500, 352, 410, 40.1, 41.7

(56) References Cited

U.S. PATENT DOCUMENTS

| | | | |
|---|---|---|---|
| 3,979,050 A | 9/1976 | Cilia ........................... | 229/66 |
| 4,623,413 A | 11/1986 | Questel et al. .............. | 156/247 |
| 5,185,201 A | * 2/1993 | Wendt ........................ | 428/296 |
| 5,192,386 A | * 3/1993 | Moir et al. .................. | 156/268 |
| 5,585,179 A | * 12/1996 | Nishiyama .................. | 428/343 |
| 5,895,714 A | 4/1999 | Malek ........................ | 428/337 |

* cited by examiner

Primary Examiner—Harold Pyon
Assistant Examiner—Elena Tsoy
(74) Attorney, Agent, or Firm—Harness Dickey, & Pierce P.L.C.

(57) ABSTRACT

A multi-layer pad of a protective material and a method for constructing the same is provided. The pad includes a lower layer and at least one upper layer, all of which are shaped to a predetermined contour. The lower layer is formed from a first material having a first surface with adhesive properties and a second surface having either no adhesive properties or a substantially reduced level of adhesive properties. Each of the upper layers include a mask portion formed from the first material and identical to the lower layer, and a release tab portion formed from a second material. The second material has at least one surface with a relatively low surface energy which substantially inhibits the surface from adhering to the first surface of the first material. In each of the upper layers, a portion of the second material is partially superimposed over the first material such that the low energy surface of the second material contacts the first surface of the first material. The multi-layer pad is constructed by superimposing a first upper layer over the lower layer such that a portion of the first surface of the first material forming part of the first upper layer contacts the second surface of the first material forming the lower layer. The second material prevents the first upper layer from completely adhering to the lower layer and permits the layers to be readily separated. Additional upper layers constructed in an identical manner to that of the first upper layer may be superimposed over the uppermost layer of the pad to achieve a multi-layer pad of protective material having a desired number of preshaped protective masks.

16 Claims, 3 Drawing Sheets

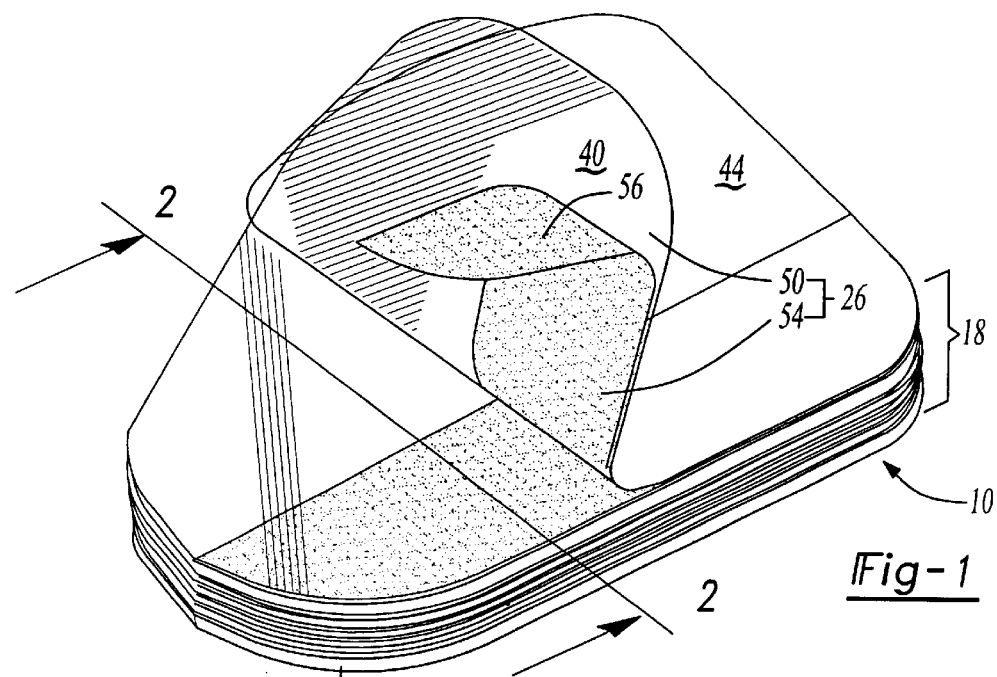
Fig-1
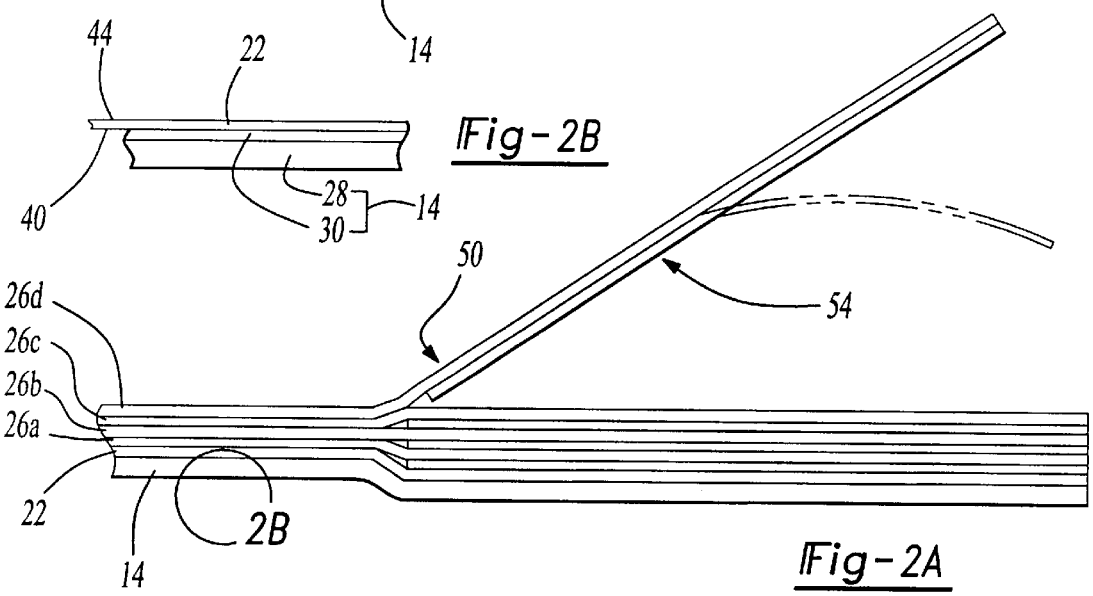
Fig-2B
Fig-2A
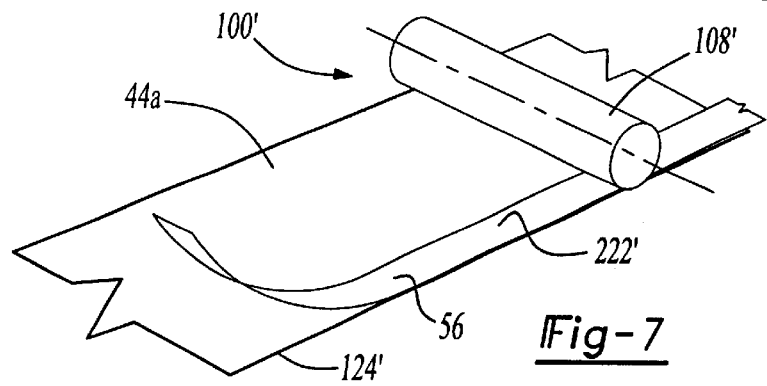
Fig-7

MULTI-LAYER PAD OF PROTECTIVE MATERIAL

BACKGROUND OF THE INVENTION

1. Technical Field

The present invention relates generally to protective masking materials. More particularly, the present invention relates to a multi-layer pad of preformed protective masking material and a method for making the same.

2. Discussion

The finish of a new vehicle is often regarded as one of the most significant characteristics of a vehicle. When the finish of an exterior or interior component is unblemished and attractive, the vehicle owner is likely to be influenced as to the quality of the vehicle in a positive manner. Conversely, when the finish is blemished as when dirty, scraped, scuffed or marred, the owner is more likely to complain to the vehicle dealer and attribute a lack of quality to the vehicle generally. Accordingly, vehicle manufacturers have expended vast resources to improve the finish of the vehicle exterior and interior components.

One area in which the vehicle manufacturers have focused their efforts relates to the materials and processes for finishing the vehicle exterior and interior components. Vast amounts of money have been expended to research and develop improved materials, processes and equipment for producing a component with an improved finish.

While the efforts undertaken on this front have significantly eliminated defects associated with the creation of the finish on the vehicle exterior and interior components, other complaints relating to the finish of these components, such as abrasions and marring, have markedly increased. Analysis of this result shows that these complaints are not new failure modes but rather a shift in the primary failure mode. Stated another way, these failure modes have always been present, but were usually accompanied with more significant failure modes (e.g., a paint finish having pops or orange peel) or simply went unreported. Modern consumers no longer tolerate these failure modes and vehicle manufacturers have been burdened with substantial costs to repair the finish of components exhibiting these failure modes.

Further analysis shows that an almost infinite number of sources may contribute to any one failure mode. For example, the finish of an exterior component may be damaged at any point in the vehicle supply process beginning with the point at which the component is finished to the point at which the vehicle is delivered to the customer. Examples of the points at which the finish of the component may be damaged therefore include loading the component into a stock rack, transporting the component to a vehicle assembly line, unloading the component from a stock rack, assembling the component to a vehicle, processing the vehicle through the assembly line, transporting the vehicle to a dealer, and storing the vehicle on the lot of the dealer. Those skilled in the art should realize that the above are broad categories encompassing an almost infinite number of variables which contribute to a failure mode. For example, in assembling the component to a vehicle, the finish of the component may be damaged when the component is rubbed against another object, such as a tool the assembly technician is carrying, the belt buckle of the assembly technician, a portion of a vehicle, the floor or a portion of the conveyance equipment which transports the vehicle down an assembly line.

Given the numerous variables which would have to be controlled to eliminate a failure mode, as well as the difficulty and cost associated with the implementation of such pervasive control measures, vehicle manufacturers have resorted to the use of protective masks, usually a self-adhesive film, to protect various vehicle components until the time at which the vehicle is delivered to the consumer. The material for these masks is typically supplied to various manufacturing and assembly areas in a bulk roll, with a technician using scissors to manually cut an appropriately shaped mask from the roll. While this strategy has made modest progress in reducing the costs associated with the repair of the finish of various vehicle components, several drawbacks have been noted.

One such drawback concerns the amount of labor expended to produce a mask and the tooling used to form the mask. The labor cost of the mask is extremely high as the process is completely manual, thus adding significant cost to the masking process and requiring vehicle manufacturers to forego masking of certain components where repair and warranty costs are sufficiently high. Furthermore, as scissors are primarily used to form the masks, the risk that the technicians forming the mask will be injured (e.g., carpal tunnel syndrome) can be significant on high-volume assembly lines.

Another drawback concerns the sizing of the mask to a component. As the process of forming the mask is completely manual, the process lacks precision and repeatability. Consequently, a technician may produce masks which are too small in certain areas and/or too large in other areas. Masks that are too small in certain areas leave the component susceptible to damage. Masks that are too large in certain areas may overhang the component, at best providing the vehicle with an unsightly appearance and at worst, interfere with the installation and/or functioning of other vehicle components. It is worthy of noting that since vehicle manufacturers supply the mask intending it to remain in place until the vehicle has been sold and prepared for receipt by a consumer, the mask is on the vehicle while the vehicle is displayed on a dealer's lot. As such, the appearance of the mask may influence the decision of the consumer.

In practice, many technicians attempt to trim masks to a desired size or shape with sharp instruments after the mask has been installed to a component. In addition to being time consuming, often times the component suffers more extensive damage from this trimming process than if the component had gone unprotected altogether.

Another disadvantage of manually forming the mask concerns the ability of a technician to nest masks together in a manner which conserves the film material. Given that many of the film materials suitable for these masks are relatively expensive, the waste involved with manual cutting adds a significant amount of cost to the masking process.

In view of the drawbacks associated with manually cutting bulk film to form masks, manufacturers of the bulk film material have responded by providing film materials which have been perforated in lines running in a lateral direction perpendicular to the length of the roll. The lines of perforations are spaced apart at regular intervals and permit a technician to remove a square or rectangular strip of film for a roll. Unfortunately, very few masking applications require a mask that is square or rectangular in shape. Consequently, this material fails to overcome many of the drawbacks associated with the bulk unperforated material.

SUMMARY OF THE INVENTION

It is one object of the present invention to provide a protective material which may be employed to mask a component in a convenient and efficient manner.

It is a more specific object of the present invention to provide a protective material for masking a component which is configured in the form of a multi-layer pad.

It is another specific object of the present invention to provide a protective material for masking a component which is formed to a predetermined contour to protect a component.

It is yet another object of the present invention to provide a method for manufacturing a multi-layer pad of protective material.

It is still another object of the present invention to provide a method for manufacturing a multi-layer pad of protective material which is formed to a predetermined contour to protect a component.

A multi-layer pad of a protective material and a method for constructing the same is provided. The pad includes a lower layer and at least one upper layer, all of which are shaped to a predetermined contour. The lower layer is formed from a first material having a first surface with adhesive properties and a second surface having either no adhesive properties or a substantially reduced level of adhesive properties.

Each of the upper layers include a mask portion formed from the first material and identical to the lower layer, and a release tab portion formed from a second material. The second material has at least one surface with a relatively low surface energy which substantially inhibits the surface from adhering to the first surface of the first material. In each of the upper layers, a portion of the second material is partially superimposed over the first material such that the low energy surface of the second material contacts the first surface of the first material.

The multi-layer pad is constructed by superimposing a first upper layer over the lower layer such that a portion of the first surface of the first material forming part of the first upper layer contacts the second surface of the first material forming the lower layer. The second material prevents the first upper layer from completely adhering to the lower layer and permits the layers to be readily separated. Additional upper layers constructed in an identical manner to that of the first upper layer may be superimposed over the uppermost layer of the pad to achieve a multi-layer pad of protective material having a desired number of preshaped protective masks.

Additional advantages and features of the present invention will become apparent from the subsequent description and the appended claims, taken in conjunction with the accompanying drawings.

BRIEF DESCRIPTION OF THE DRAWINGS

FIG. 1 is a perspective view of a multi-layer pad constructed in accordance with the teachings of a preferred embodiment of the present invention;

FIG. 2A is a cross-sectional view taken along the line 2—2 in FIG. 1;

FIG. 2B is an enlarged view of the encircled area in FIG. 2A;

FIG. 7 is a perspective view similar to FIG. 4 illustrating another preferred configuration of the laminating press.

DETAILED DESCRIPTION OF THE PREFERRED EMBODIMENT

Figure 3:
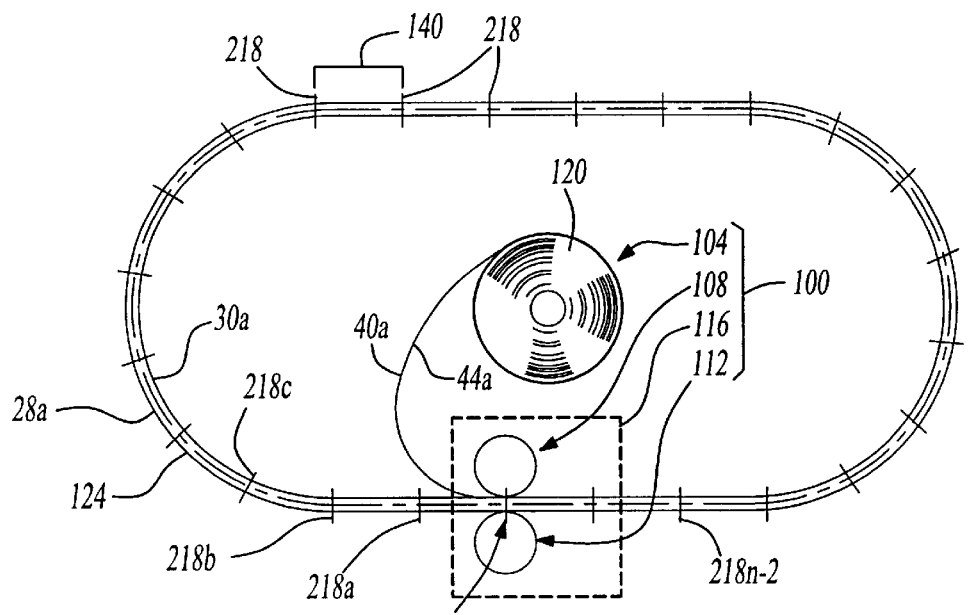
FIG. 3 is a schematic view of a laminating machine used to form the multi-layer pad of the present invention.

With regard to FIGS. 1, 2A and 2B of the drawings, a multi-layer pad constructed according to the teachings of the present invention is generally identified by reference numeral 10. In the particular embodiment illustrated, pad 10 is shown to include a backing layer 14 and a plurality of masks 18 formed by a lower film layer 22 and at least one upper film layer 26. Backing layer 14 is preferably formed from a chipboard material 28 having a thickness of about 0.02 inches to about 0.06 inches. Backing layer 14 preferably includes a nonadhering layer 30, such as a polyliner or silicone impregnentation, characterized by a low surface energy level to inhibit bonding with adhesive materials. The purpose of nonadhering layer 30 will be discussed in greater detail, below.

Lower film layer 22 is formed from a first material consisting of a suitable protective material, such as release paper or plastic, having a first surface 40 with adhesive properties and a second surface 44 characterized by a low surface energy level to inhibit bonding with adhesive materials. Hereinafter, first surface 40 will be referred to as simply being "adhesive" or having "adhesive characteristics" and both nonadhering layer 30 and second surface 44 will be referred to as simply being "nonadhering".

Several factors are involved in selecting the first material, including the configuration of the component to be protected and the material from which it is made, as well as the damage which is to be guarded against. The issues involved will dictate not only the type of material, but also the thickness of the material and the adhesive mechanism to be employed to adhere the film to the component to be protected. Polymeric plastic films having a thickness of approximately 0.002 inches to approximately 0.015 inches are presently preferred due to their strength and resistance to tearing.

The adhesive characteristics of first surface 40 are preferably generated through the use of a pressure-sensitive adhesive. The strength of the pressure-sensitive adhesive may be formulated according to the particular application to which each of the film layers are to be used. For example, where the film layers are to be applied temporarily, the pressure-sensitive adhesive employed may have a relatively low strength. Conversely, where the film layers are to be applied permanently, the pressure-sensitive adhesive employed may have a relatively high strength.

Suitable polymeric plastic films having a pressure-sensitive adhesive are readily available from manufacturers such as American Built Rite, Nitto and Ivex. These films are preferably stabilized against ultraviolet light and have both high tensile strength and high elongagion. One particularly suitable polymeric plastic film manufactured by American Built Rite and identified as their ProtecRite® 410 AutoWrap film has received wide-spread acceptance by vehicle manufacturers for use as a masking material. This material is formed from polypropylene having a thickness of approximately 4 mils, an adhesion of 11.0, a tensile strength of between 4200 and 6000 p.s.i. and an elongation of about 700%.

Each of the upper film layers 26 include a mask portion 50 formed from the first material and a release tab portion 54 formed from a second material. Mask portion 50 is essentially identical in construction to that of lower film layer 22.

At least one surface 56 of the second material is nonadhering and should be characterized by a low surface energy level, typically below 36 dyne, to inhibit bonding with the first surface 40 of the first material. Polyethylene having a thickness of about 0.002 inches to about 0.015 inches is presently preferred for the second material, but other materials, such as silicone release paper, may also be used.

The second material forming the release tab portion 54 of an upper film layer 26 is partially superimposed over the first surface 40 of the first material forming the mask portion 50 of the upper film layer 26. The second material forming release tab portion 54 may extend outwardly of and overhang one or more edges of mask portion 50. Preferably, the second material forming release tab portion 54 abuts at least two edges of mask portion 50 and the width of release tab portion 54 is between 0.2 and 2.0 inches wide. In the particular embodiment illustrated in FIGS. 1 and 2, each upper film layers 26 are constructed so as to expose upwards of about 85% of the surface area of first surface 40 of mask portion 50 for contact with second surface 44 of lower film layer 22.

Multi-layer pad 10 is constructed by superimposing lower film layer 22 over backing layer 14 such that first surface 40 contacts nonadhering layer 30. Due to the properties of nonadhering layer 30, lower film layer 22 is releasably coupled to backing layer 14. Backing layer 14 is therefore the foundation of multi-layer pad 10 onto which layers of protective masks 18 are superimposed.

A first upper film layer 26a is next superimposed over lower film layer 22 such that a portion of the first surface 40 of the first material forming part of the first upper film layer 26a contacts the second surface 44 of the first material forming the lower film layer 22. The second material prevents the first upper film layer 26 from completely adhering to the lower film layer 22 and permits the layers to be readily separated. Additional upper film layers 26 constructed in an identical manner to that of the first upper film layer 26 may be superimposed over the uppermost film layer of the multi-layer pad 10 to achieve a multi-layer pad of protective material having a desired number of preshaped protective masks 18.

As many vehicle assembly lines produce a family of similarly styled vehicles, several styles of masks may be needed to mask similar components on the family of vehicles. Often times the differences between these styles is not apparent to the naked eye. In such instances, the backing material, the first material or the second material may be color-coded to a predetermined schedule or marked in a desired manner to identify a mask 18 or multi-layer pad 10 as being related to a particular vehicle or component.

Figure 4:
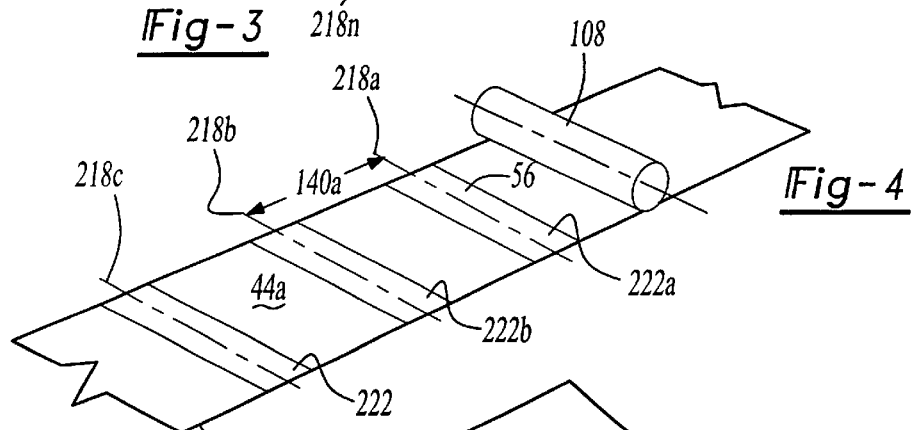
FIG. 4 is a perspective view of a portion of the laminating machine of FIG. 3.

Referring now to FIGS. 3 and 4, a press 100 is illustrated forming the multi-layer pads of the present invention. Press 100 is a conventional and commercially available laminating press which includes a feed roller 104, an upper press roller 108, a lower press roller 112 and pressure adjusting means 116 for adjusting the pressure which upper and lower press rollers 108 and 112 collectively exert on a workpiece. Feed roller 104 includes a bulk roll 120 of first material which is fed between upper and lower press rollers 108 and 112 such that the second surface 44a of first material is adjacent upper press roller 108.

Disposed between upper and lower press rollers 108 and 112 is a backing loop 124 formed from the material which comprises backing layer 14. Backing loop 124 includes a nonadhering layer 30a which is placed toward the interior 128 of backing loop 124. The side opposite nonadhering layer 30a is adjacent lower press roller 112. Backing loop 124 is sized in a predetermined manner to permit the length or perimeter of the backing loop 124 to be divided into a desired number of sections 140. The purpose and nature of sections 140 will be discussed in detail below.

With additional reference to FIG. 5, the method for forming the multilayer pad of the present invention will now be discussed. The methodology is entered at bubble 200 and proceeds to block 204 where backing loop 124 of a desired size is formed. In forming backing loop 124, a sheet of the material which forms backing layer 14 is cut to a desired length and width, after which the edges are fastened together by a suitable fastening means, such as an adhesive or an adhesive tape. The methodology next proceeds to block 208 where backing loop 124 is inserted into press 100 in the orientation described above. The methodology then advances to block 212.

In block 212, the methodology the first material is advanced from feed roller 104 around upper press roller 108 and onto backing loop 124 such that first surface 40 contacts nonadhering layer 30a. Backing loop 124 and feed roller 104 are advanced to apply one complete layer of the first material to backing loop 124. The methodology then advances to block 216.

In block 216 the backing loop 124 is marked to identify one or more predetermined positions 218 which are to be the boundaries of the sections 140 into which backing loop 124 will be divided. Depending on the size of the mask to be produced, the number of sections 140 may vary upwards from one to any desired number. The mark may be a physical mark made on the backing loop 124 or the first material on the backing loop 124, or it may be the documenting of predetermined points along the length of backing loop 124 as determined from counters or various other devices which permit the position of backing loop 124 to be tracked.

The methodology next proceeds to block 220 where backing loop 124 is indexed to a first predetermined position 218a. It should be noted that press 100 continues to apply the first material over any previous layer of film as backing loop 124 is indexed. At first predetermined position 218a, a strip 222 of second material is applied over the second surface 44 of the first material forming the previous film layer. Strip 222 is applied in a manner such that the nonadhering surface 56 of the second material is spaced apart from the second surface 44 of the first material. As shown, strip 222 is perpendicular to the length of backing loop 124. The press is further indexed to laminate a film layer of the first material over the nonadhering second surface 44 of the first material forming the previous layer and the nonadhering surface 56 of the second material. The methodology then advances to decision block 224.

In decision block 224, the methodology determines if the backing loop 124 has been indexed to the last predetermined position 218n along its length. If backing loop 124 has not been indexed to the last predetermined position 218n, the methodology proceeds to block 228 where backing loop 124 is indexed to a next predetermined position 218b. As mentioned previously, press 100 continues to apply the first material over any previous layer of film as backing loop 124 is indexed.

At next predetermined position 218b, another strip 222 of the second material is applied over the second surface 44 of the first material forming the previous film layer. Strip 222 is applied in a manner such that the nonadhering surface 56 of the second material is spaced apart from the second surface 44 of the first material. As shown, strip 222 is perpendicular to the length of backing loop 124. The press is further indexed to laminate a film layer of the first material over the nonadhering second surface 44 of the first material forming the previous layer and the nonadhering surface 56 of the second material. The methodology then advances to decision block 224.

Returning to decision block 224, if backing loop 124 has been indexed to the last predetermined position 218n, the methodology proceeds to decision block 232 where the methodology determines whether the last upper film layer 26n has been applied to the pad. If the last upper film layer 26n has not been applied to the pad, the methodology returns to block 220. If the last upper film layer 26n has been applied to the pad, the methodology advances to block 236 where the first material from feed roller 104 is cut and backing loop 124 is removed from press 100 and cut or slit into sections 140. The edge of a section 140 is defined by the centerline of a strip 222 which coincides with predetermined position 218. In the example illustrated, section 140a is formed by cutting strip 222a along position 218a and by cutting strip 222b along position 218b. The methodology then proceeds to block 240.

Figure 6:
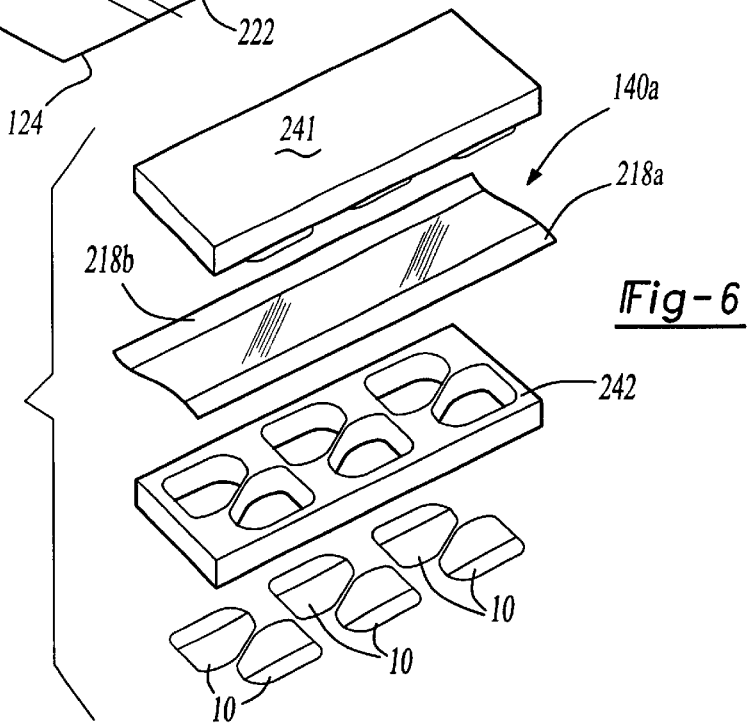
FIG. 6 is a perspective view of a section of the backing loop and the multi-layer pads formed from the section.

In block 240, sections 140 are processed in a desired manner to achieve a pad of a predetermined shape. Preferably, two adjacent edges of each section 140 are trimmed in a shear to square these edges relative to each other. The sections 140 which have been trimmed may then be processed, for example, in a die to shear the entire pad to a predetermined shape as illustrated in FIG. 6. As shown, die includes an upper member 241 member and a lower member 242. The methodology then proceeds to bubble 244 and terminates.

While the method for forming the multi-layer pad of the present invention has been described with regard to a particular embodiment, those skilled in the art will appreciate that the invention, in its broader aspects may be practiced somewhat differently. For example, a continuous strip of second material may be fed into press 100' parallel to the length of backing loop 124' between the nonadhering surface of a previous layer and the adhesive surface of an upper layer as shown in FIG. 7. Sections 140' would then be taken along the backing loop 124' in a lateral direction, as opposed to the longitudinal direction as described above.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A multi-layer pad of protective film masks, the pad comprising:

a backing layer having a first portion and a second portion, the first portion formed from a chipboard material, the second portion having a nonadhering surface, the second portion fixedly coupled to the first portion such that the nonadhering surface is spaced apart from the first portion, the backing layer having a thickness of about 0.02 inches to about 0.06 inches;

a first layer formed from a first material, the first material having an adhesive surface and a nonadhering surface, the adhesive surface substantially parallel to and spaced apart from the nonadhering surface, the adhesive surface of the material forming the first layer adjacent and releasably coupled to the nonadhering surface of the second portion of the backing layer; and a second layer having a mask portion and a release tab portion, the mask portion of the second layer formed from the first material, the release tab portion of the second layer formed from a second material having a nonadhering surface, the second material at least partially superimposed over a portion of the first material such that the nonadhering surface of the second material forming the release tab portion is adjacent and releasably coupled to the the adhesive side of the first material forming the mask portion, the second layer superimposed over the first layer such that the adhesive surface of the first material forming the second layer is coupled to the nonadhering surface of the first material forming the first layer and the release tab portion of the second layer creates a barrier to prevent the mask portion of the second layer from adhering to the first layer at a predetermined point.

2. A multi-layer pad of protective film masks, the pad comprising:

a first layer formed from a first material having an adhesive surface and a nonadhering surface, the adhesive surface substantially parallel to and spaced apart from the nonadhering surface;

a second layer having a mask portion and a release tab portion, the mask portion of the second layer formed from the first material, the release tab portion of the second layer formed from a second material having a nonadhering surface, the second material at least partially superimposed to a portion of the first material forming the mask portion such that the nonadhering surface of the second material forming the release tab portion is adjacent and releasably coupled to the adhesive side of the first material forming the mask portion, the second layer superimposed over the first layer such that the adhesive surface of the first material forming the mask portion of the second layer is coupled to the nonadhering surface of the first material forming the first layer and the release tab portion of the second layer creates a barrier to prevent the mask portion of the second layer from adhering to the first layer at a predetermined point.

3. The multi-layer pad of claim 2, wherein the first material is a polymeric film.

4. The multi-layer pad of claim 3, wherein the polymeric film includes a pressure-sensitive adhesive.

5. The multi-layer pad of claim 4, wherein the pressure-sensitive adhesive is adapted to fixedly but removably secure the first material to a desired object.

6. The multi-layer pad of claim 2, wherein the first material is substantially formed from release paper.

7. The multi-layer pad of claim 2, wherein the release tab portion is formed from polyethylene.

8. The multi-layer pad of claim 2, wherein the release tab portion is formed from release paper.

9. The multi-layer pad of claim 2, wherein the first material is color-coded.

10. The multi-layer pad of claim 2, wherein the release tab portion is color-coded.

11. The multi-layer pad of claim 2, further comprising a backing layer coupled to the first layer.

12. The multi-layer pad of claim 11, wherein the backing layer is formed from a chipboard material.

13. The multi-layer pad of claim 12, wherein the chipboard material includes a surface with nonadhering properties, the backing layer coupled to the first layer such that the nonadhering surface of the chipboard material is adjacent the adhesive surface of the first material.

14. The multi-layer pad of claim 13, wherein the chipboard has a thickness of about 0.02 inches to about 0.06 inches.

15. The multi-layer pad of claim 2, wherein at least 85% of the surface of the second film layer abutting the first film layer is adhesive.

16. The multi-layer pad of claim 1, wherein the first and second layers are cut to a predetermined shape after the nonadhering surface of the first material forming the first layer has been removably coupled to the adhesive surface of the first material forming the mask portion of the second layer.

* * * * *

UNITED STATES PATENT AND TRADEMARK OFFICE
CERTIFICATE OF CORRECTION

Figure 5:
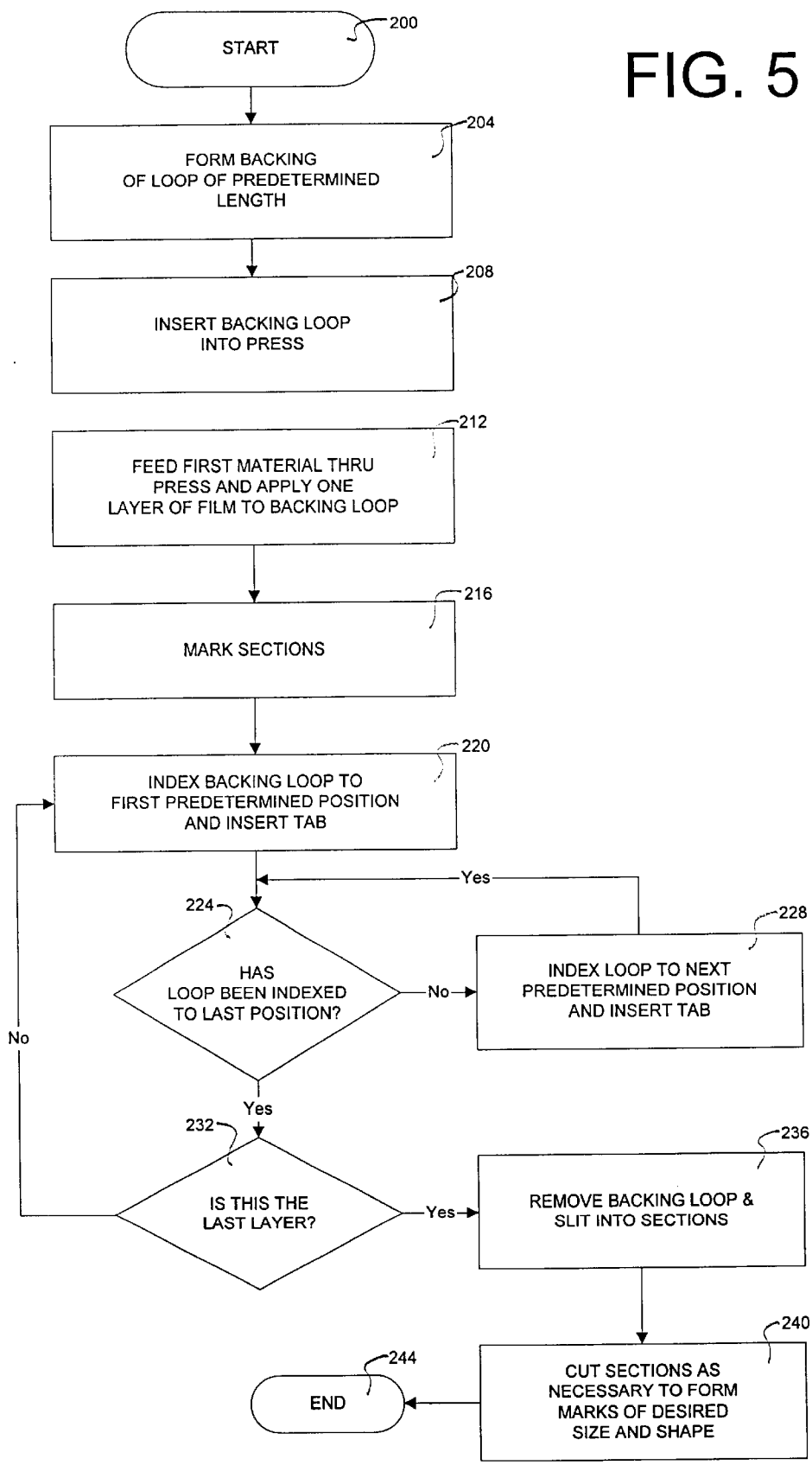
FIG. 5 is a schematic diagram in flow chart form of the method of the present invention.
Figure 5:
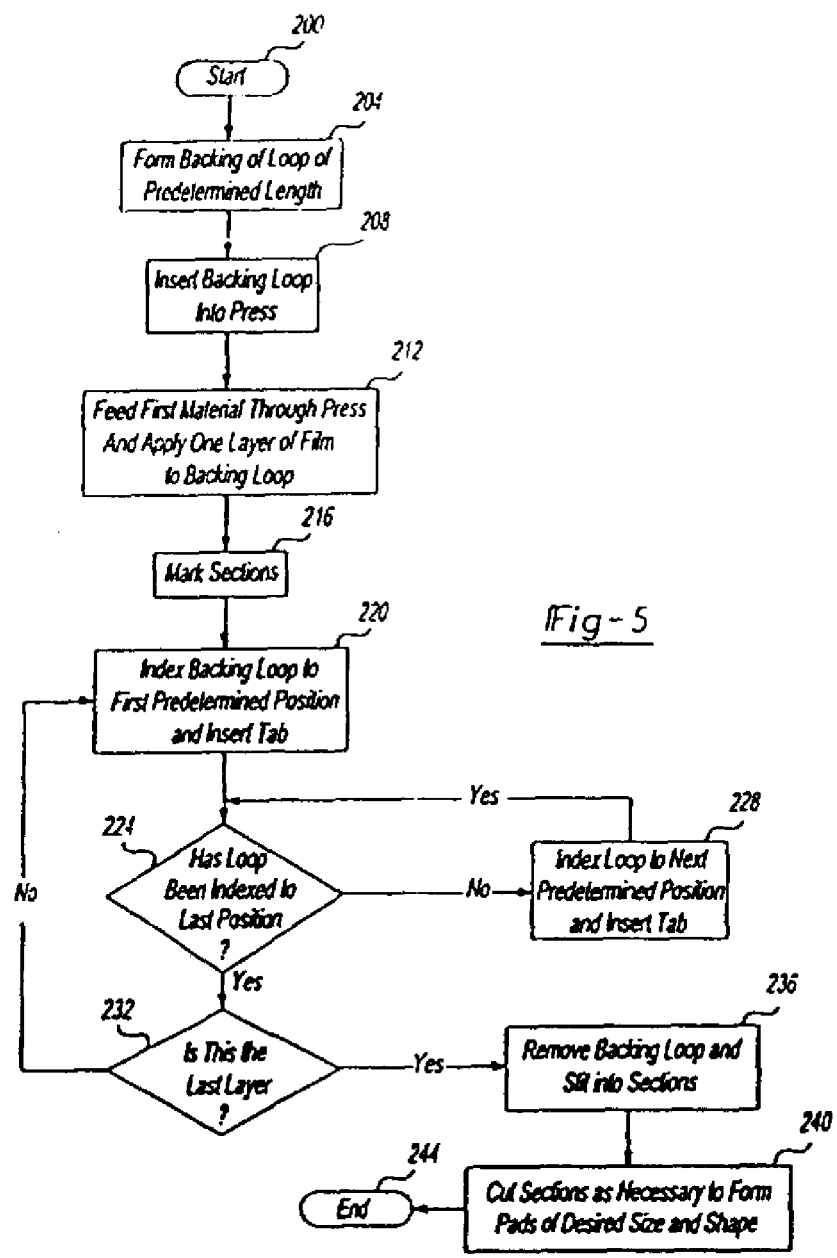

PATENT NO. : 6,338,886 B1
DATED : January 15, 2002
INVENTOR(S) : Lee S. Jacobsen It is certified that error appears in the above-identified patent and that said Letters Patent is hereby corrected as shown below:

<u>Drawings,</u>
The drawing sheet, consisting of Fig. 5, should be deleted to be replaced with the drawing sheet, consisting of Fig. 5, as shown on the attached page.

Signed and Sealed this

Twenty-eighth Day of May, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO. : 6,338,886 B1
DATED : January 15, 2002
INVENTOR(S) : Lee S. Jacobsen Page 2 of 2

It is certified that error appears in the above-identified patent and that said Letters Patent is hereby corrected as shown below:

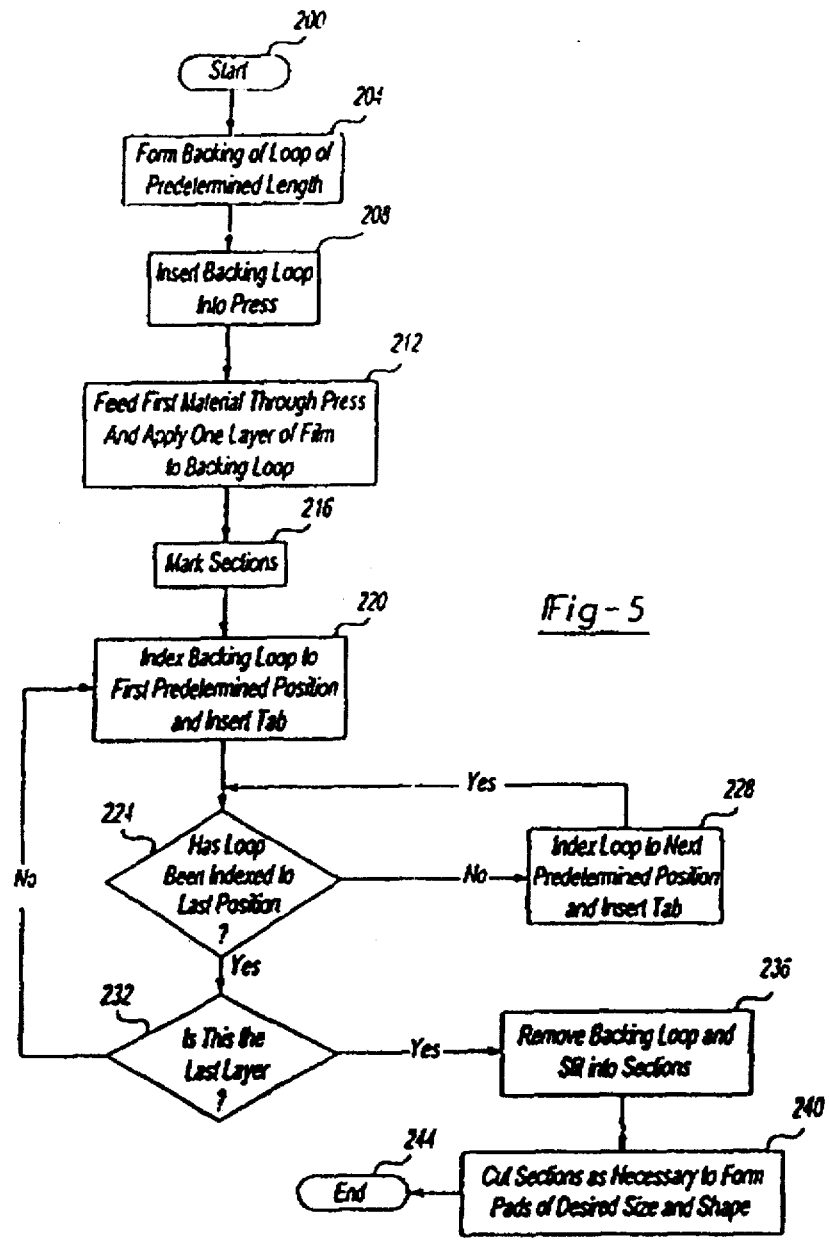

Fig-5

UNITED STATES PATENT AND TRADEMARK OFFICE
CERTIFICATE OF CORRECTION

PATENT NO. : 6,338,886 B1
DATED : January 15, 2002
INVENTOR(S) : Lee S. Jacobsen It is certified that error appears in the above-identified patent and that said Letters Patent is hereby corrected as shown below:

Drawings,
The drawing sheet, consisting of Fig. 5, should be deleted to be replaced with the drawing sheet, consisting of Fig. 5, as shown on the attached page.

Signed and Sealed this

Eleventh Day of June, 2002

*Attest:*

*Attesting Officer*

JAMES E. ROGAN
*Director of the United States Patent and Trademark Office*